United States Patent [19]

Bae

[11] Patent Number: 5,258,839
[45] Date of Patent: Nov. 2, 1993

[54] VIDEO SYSTEM AND METHOD FOR DISPLAYING AT LEAST TWO IMAGES ON A DIVIDED SCREEN

[75] Inventor: Seong K. Bae, Kyungki, Rep. of Korea

[73] Assignee: Samsung Electronics Co., Ltd., Rep. of Korea

[21] Appl. No.: 818,096

[22] Filed: Jan. 8, 1992

[30] Foreign Application Priority Data

Jan. 8, 1991 [KR] Rep. of Korea .................. 91-130

[51] Int. Cl.$^5$ .................. H04N 7/08; H04N 5/268
[52] U.S. Cl. .................. 358/142; 358/181
[58] Field of Search .................. 358/181, 182, 183

[56] References Cited

U.S. PATENT DOCUMENTS

| | | | |
|---|---|---|---|
| 4,843,483 | 6/1989 | Bogner | 358/183 |
| 4,868,660 | 9/1989 | Rufray | 358/181 |
| 4,890,162 | 12/1989 | McNeeley et al. | 358/183 |
| 4,890,168 | 12/1989 | Inoue et al. | 358/183 |
| 4,905,077 | 2/1990 | Ishii | 358/22 |
| 4,985,755 | 1/1991 | Shimoda et al. | 358/183 |
| 5,040,067 | 8/1991 | Yamagaki | 358/183 |
| 5,047,857 | 9/1991 | Duffield et al. | 358/183 |
| 5,128,766 | 7/1992 | Choi | 358/183 |
| 5,144,438 | 9/1992 | Kim | 358/181 |

Primary Examiner—John K. Peng
Attorney, Agent, or Firm—Sughrue, Mion, Zinn, Macpeak & Seas

[57] ABSTRACT

The present invention is directed to a system for and method of displaying two or more video input signals on a screen without being contracted. At least one horizontal or vertical divisional position is set during the entire scanning period of a screen, and each of the inputted video signals is alternately switched at the divided positions to display them on a corresponding partial screen, thereby displaying at least two video input signals at once on a screen.

8 Claims, 3 Drawing Sheets

VIDEO SYSTEM AND METHOD FOR DISPLAYING AT LEAST TWO IMAGES ON A DIVIDED SCREEN

BACKGROUND OF THE INVENTION

1. Field of the Invention

The present invention relates to a system and a method thereof, for simultaneously displaying a plurality of video input images on a screen from a video signal recording/reproducing or playback apparatus such as a Video Cassette Recorder (VCR), a Camcorder, or a Video Tape Player (VTP).

2. Description of the Prior Art

A Picture-in-Picture (PIP) system is conventionally known to display two video input images at once on a single video screen. A main image is represented on the entire screen while another relatively smaller sub-image is represented on the corner area of an upper or lower portion of the screen. During the display of two images in a PIP system, though the sub-image is totally displayed, its quality deteriorates due to screen contraction caused by a pixel extraction, and the main image is reduced corresponding to the display area of the sub-image.

Another prior art system resolves the problems of the above system in a manner whereby a PIP image is embodied in a desired position by selecting at least one bank of a plurality of banks that is fixed on a monitor combining therewith a horizontal window signal in light of a vertical window signal. A twice enlarged PIP image in a horizontal direction, a vertical direction, or both can thus be selectively obtained. The PIP image thus generated, however, is contracted because its area is limited by the fixed bank and its enlargement is constricted to the range of the selected bank area.

SUMMARY OF THE INVENTION

The object of the present invention is to provide a system for displaying at least two images on a screen divided into vertical and horizontal directions without image contraction by extracting one pixel signal of more than two video input signals.

Another object of the present invention is to provide a method for displaying at least two images on a screen divided into vertical and horizontal directions without contracting an image by extracting one pixel signal of more than two video input signals.

Still another object of the present invention is to provide a system for displaying at least two images on a screen and a method thereof.

According to the present invention, a video signal display system comprises a switching means for selectively outputting any one of at least two video input signals; means for controlling said switching means to alternately output said video input signals corresponding to partial period intervals, which are at least a time point within a horizontal or vertical synchronizing period constituting one field of a screen, by switching at the beginning of said partial period intervals; and means for inputting control data to said control means.

Also, the present invention provides a method for displaying at least one image on a screen comprising steps of inputting at least two video input signals; setting at least two partial period intervals within a horizontal or vertical synchronizing period constituting one field of a screen and selecting a video input signal to be displayed in each of said partial period intervals; and alternatively outputting said video signals corresponding to each of said partial period intervals relatively by switching at the beginning of said partial period intervals.

BRIEF DESCRIPTION OF THE DRAWINGS

The present invention will be explained in detail below with reference to the accompanying drawings, in which.

DETAILED DESCRIPTION OF THE INVENTION

Figure 1:
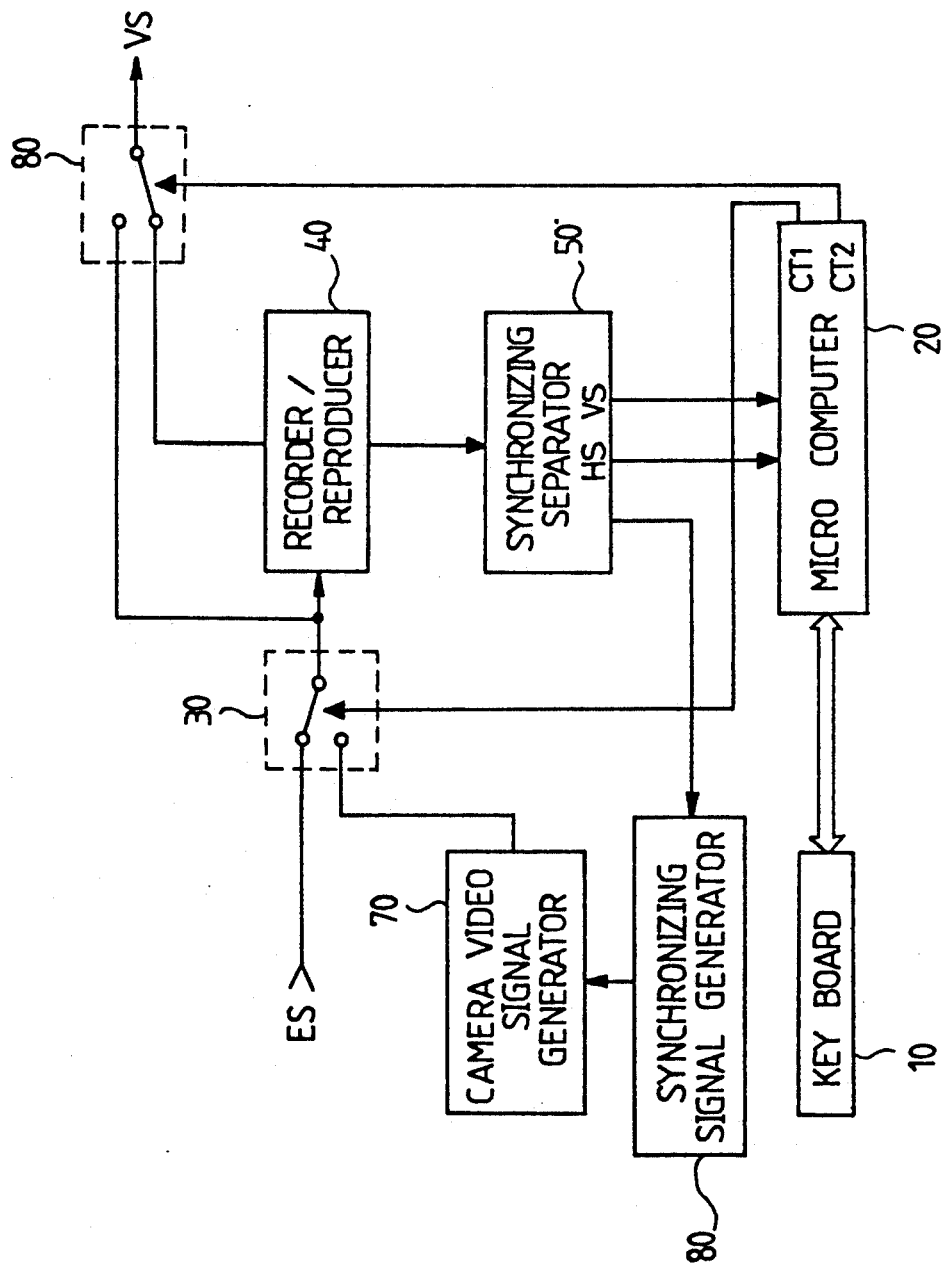
FIG. 1 is a block diagram illustrating a system for displaying two video input signals at once on a screen according to the present invention.

According to a display system of the present invention, as illustrated in FIG. 1, a keyboard 10 includes input signal selecting keys for selecting any one of the signals from a camera video signal generator 70 and an external signal (ES) such as a broadcast signal, and edit keys for selecting screen division and adjustment.

A microprocessor 20 not only stores the control signal data generated by the operation of the keyboard 10 but also controls each of the function portions of a system based on the control data. The microprocessor 20 has first and second control output terminals CT1 and CT2 to control first and second switches 30 and 80.

The first switch 30 receives both the external signal (ES) such as a broadcast signal and also the signal from the camera video signal generator 70 to selectively output a signal according to the control of the microprocessor 20. The video signal selected by the first switch 30 is simultaneously applied to both the second switch 80 and also a recorder/reproducer 40.

The recorder/reproducer 40 selectively records the signal from the first switch 30 in a record mode, or reproduces the previous recorded signal to provide it to the second switch 80 in a reproduce mode.

The second switch 80 selectively outputs any one of the signals from the first switch 30 and the recorder/reproducer 40 according to the control of the microprocessor 20. The final output signal from the second switch 80 is displayed on the screen of a monitor (not shown).

The recorder/reproducer 40 is connected to a synchronizing separator 50. The synchronizing separator 50 detects the horizontal and vertical synchronizing signals of the signals from the first switch 30 so as to apply them to both the microprocessor 20 and also a synchronizing signal generator 60.

Therefore, the synchronizing signal generator 60 receives any one of the (horizontal and vertical) synchronizing signals from the synchronizing separator 50 to generate the corresponding synchronizing signal of a camera video signal, so that the synchronizing signal is fed to the camera video signal generator 70. The microprocessor 20 can precisely control the first switch 30 and the second switch 80 based on the horizontal and vertical signals from the synchronizing separator 50, so that the output signal from the first switch 30 is recorded at the recorder/reproducer 40 in accord with the synchronizing timing.

Figure 2A:
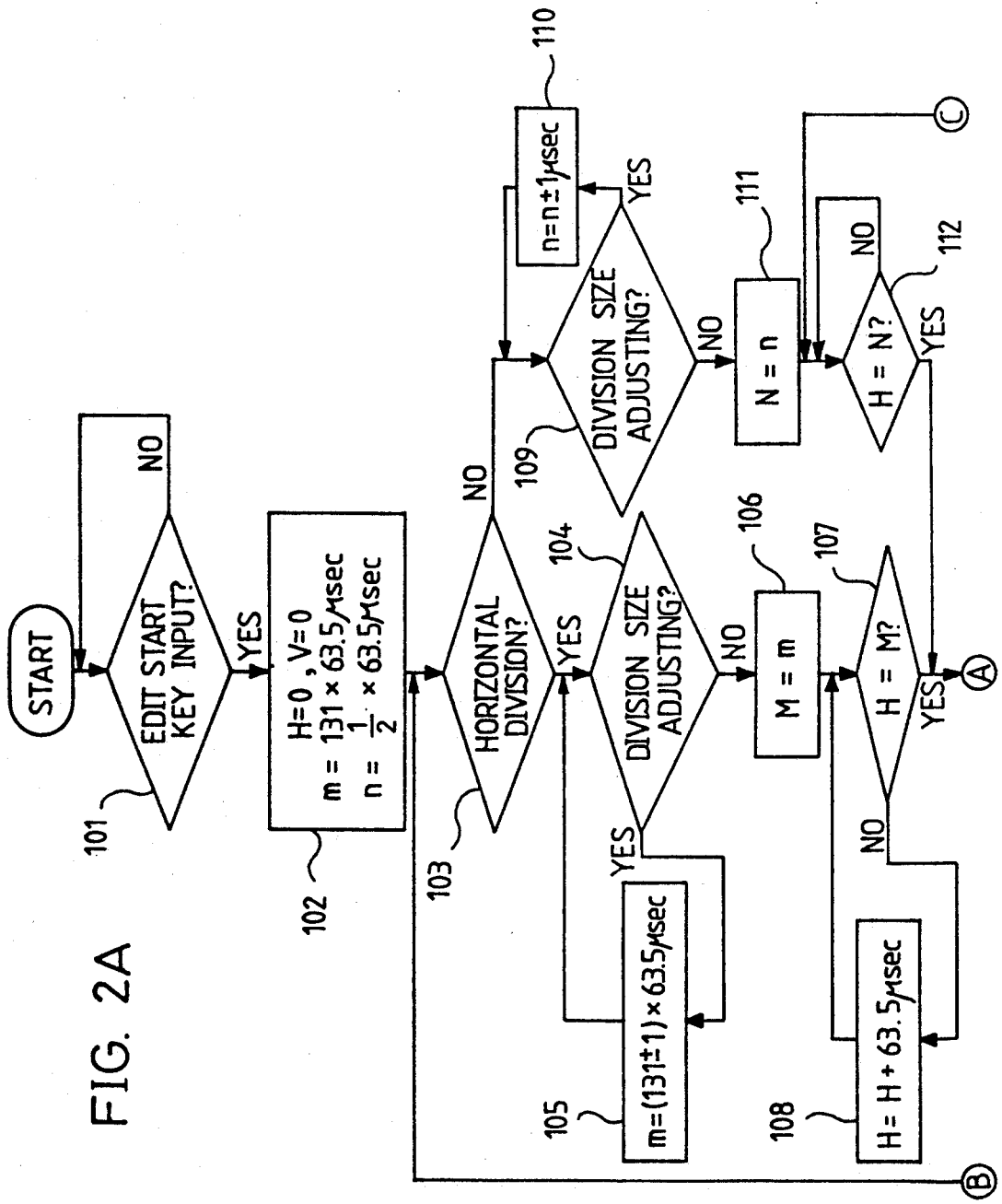
FIG. 2 is a flow chart illustrating the operation of the present invention.
Figure 2B:
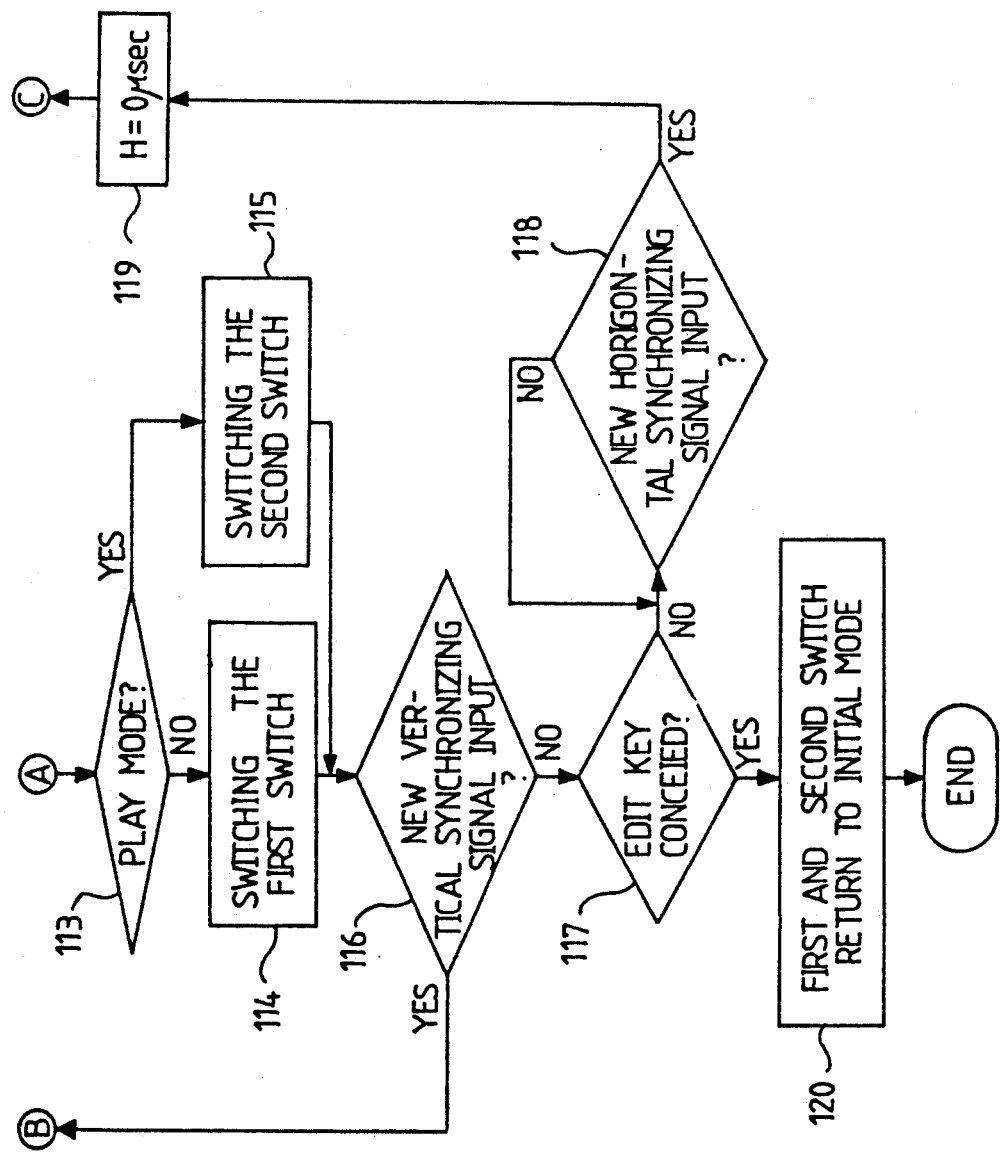

The operation of a display system is performed according to a display control method illustrated in the flow chart of FIG. 2, which is based on National Television System Committee (NTSC) standards (525 scan lines per one frame and one horizontal scan time of 63.5 msec). The method may be performed under control of microcomputer 20 (shown in FIG. 1) in accordance with a stored control program (not shown), or alternatively controlled by any other suitable control device as well known in the art.

Assuming that during the display of a signal from an external source on a monitor screen where a plurality of images have been intended to be displayed on a single screen, the operation of the present invention begins at step 101 where it is determined whether the edit input key of a keyboard 10 is pressed to divide a plurality of images on a screen. If pressed, step 101 goes to step 102 to set initial values as to the horizontal or vertical division of a screen. For example, each of the horizontal and vertical scanning times H and V is set at "0," and the horizontal or vertical division position is located at the center of a screen, each of which is calculated into the scanning times of a horizontal division interval m (=131*63.5 msec) and a vertical division interval n (=½*63.5 msec) in light of one field (one frame equals to two fields).

If the initial values are set, step 102 is processed to step 103 to judge whether the key input selects the horizontal or vertical divisional mode. In a horizontal divisional mode of step 104, the divisional size of a screen is adjusted. Step 104 is processed to step 105 to move the screen divisional position (m) up and down using the input keys of a keyboard 10 such as "+/−" keys. At that time, the unit interval at the horizontal division corresponds to 1H, for example 63.5 is used. A desired screen divisional completion fixes the horizontal divisional interval M at step 106. Step 106 goes to step 107 to discriminate whether the horizontal scanning timing H has arrived at the horizontal divisional interval M. If it has arrived, flow passes from step 107 to step 113 to identify whether a recorder/reproducer 40 is operated in a recording mode or a reproducing mode.

If the recorder/reproducer 40 performs in the recording mode, step 113 is processed to step 114 to switch a first switch 30, but not a second switch 80, so that the display signal is changed into a camera signal instead of an exterior signal ES. Thus, the corresponding screen related to one field is occupied at its upper area with the exterior signal and at its lower area with the camera signal.

If the recorder/reproducer 40 performs in the reproducing (play) mode, flow passes from step 113 to step 115 to switch the second switch 80, so that the video signal from the recorder/reproducer 40 is applied to the second switch 80. Thus, the corresponding one field screen is displayed at its upper area with the previously recorded (reproduced) signal and at its lower area with the camera signal or exterior signal.

During performance of the horizontal division, if a new vertical synchronizing signal is inputted at step 116, the screen field is changed over to newly count the horizontal synchronizing signal with the horizontal divisional procedures being repeated. Therefore, under the condition that a screen is divided into up, down, left and right portions, two video input signals are continuously fed to each of the partial screens divided into up and down portions in a horizontal division.

On the other hand, if the vertical division is performed, step 103 jumps to step 109 to adjust the screen divisional size. Then, at step 111 the vertical divisional interval N is set. At step 112 it is determined whether the vertical scanning period H is equal to the vertical divisional interval N. If the two values are the same, step 112 is processed to step 113 to determine whether the play mode state of the recorder/reproducer 40 is operated. Thereafter, the first and second switches 30, 80, or both are switched through step 114 or step 115 in the same manner as those of the horizontal division as described above. Next, it is confirmed at step 116 whether a new vertical synchronizing signal has been input. Step 116 goes to step 117 to judge whether or not the vertical synchronizing signal and the canceling signal input of a screen divisional edit key coincide. If not, the flow idles at step 118 until a new horizontal synchronizing signal is input. If the new horizontal synchronizing signal is received, step 118 is processed to 119 to set the scanning time at "0" while the above display procedures are being repeated. Thus, the corresponding video signals are continuously displayed on each portion of the screen divided vertically.

As explained above, the present invention can display two or three signals of an exterior signal, a camera signal and a reproducing signal on a screen divided horizontally or vertically. Of course, the arrangement and the numbers of switching devices are properly changed according to its design so that a screen is divided into a plurality of areas so that at least two input images are displayed at once on a screen.

Accordingly, the present invention can divide a screen in artificial sizes into up, down, left and right portions, while on the divided screen, two or more video images are displayed without being contracted, and the divided screen size is easy to edit as desired.

What is claimed is:

1. A video signal display system for displaying at least two video signals on a screen, the system comprising:
   a first switching means for selectively outputting any one of at least two different video input signals;
   means for simultaneously displaying the at least two different video signals on the screen without image contraction, said means including controlling means for controlling said first switching means to alternately output said video input signals corresponding to partial period intervals that are at least a time point within one of a horizontal and vertical synchronizing period constituting one field of a screen, said first switching means switching at the beginning of said partial period intervals; and
   inputting means for inputting control data to said control means.

2. The video signal display system as claimed in claim 1, wherein said displaying means further comprises means for providing at least one additional video signal and a second switching means for selectively outputting any one of the output video signals from said first switching means and said at least one additional video signal.

3. A video signal display system for displaying at least two video signals on a screen, the system comprising:
   a first switching means for selectively outputting any one of at least two video input signals;
   means for providing at least one additional video signal;
   second switching means for selectively outputting any one of the output video signals from said first switching means and said at least one additional video signal;
   controlling means for controlling said first switching means to alternately output said video input signals corresponding to partial period intervals that are at least a time point within one of a horizontal and vertical synchronizing period constituting one field of a screen, said first switching means switching at the beginning of said partial period intervals;

inputting means for inputting control data to said control means; and means for synchronizing the vertical and horizontal signals of the video signal to be input to said first and second switching means respectively.

4. A display system comprising:

a keyboard for generating control data signals based on input key signals from selected keys, said control data used to select one of a plurality of input display signals, wherein said display signals include a video camera signal and a broadcast signal, each signal having at least one of a horizontal and a vertical synchronizing signal therein;

a processing unit for storing said control data and for generating an output control signal to one of a plurality of control output terminals;

a first switch device, coupled to a first control output terminal of said processing unit, for receiving at least said video camera signal and said broadcast signal, and for selectively outputting a first source signal as one of said signals thus received in accordance with said output control signal generated by said processing unit;

a recording/reproducing device for receiving said first source signal output from said first switch device, and for outputting a second source signal when the system is in a reproduction mode;

a synchronizing signal unit, coupled to said reproducing device, for separating and outputting both horizontal and vertical signals from said second source signal;

a second switch device, coupled to a second control output terminal of said processing unit, for receiving both said first and second source signals, and outputting one of said first and second source signals as a video display signal, said display signal being output in accordance with the output control signal generated by said processing unit;

wherein said processing unit controls the display system by controlling said first and second switch devices in synchrony with said horizontal and vertical signals.

5. The system recited in claim 4, wherein said keyboard generates divisional mode data in accordance with a selection of one of a horizontal and vertical divisional modes, said divisional mode determining field positions in which at least two images are both displayed on a single video display screen.

6. The system of claim 5, wherein said video camera signal is output to one field of the video display screen and recorded by said recording/reproducing device in a recording mode of the system.

7. The system of claim 6, wherein said processing unit sets a horizontal scanning time with a size of a field selected for display of a first one of said at least two images, and said first image is displayed in its respective field on the divided display screen during a scanning of the display screen prior to the scanning time exceeding said set horizontal scanning time.

8. A video signal display method for displaying at least two video signals on a screen comprising steps of:

inputting at least two video input signals;

setting at least two partial period intervals within one of a horizontal and vertical synchronizing period constituting one field of a screen and selecting a video input signal to be displayed in each of said partial period intervals;

alternatively outputting said video signals corresponding to said partial period intervals respectively by switching at the beginning of said partial period intervals and;

displaying the at least two video signals on the screen without contracting the at least two video signals.

* * * * *